United States Patent
Smola

(10) Patent No.: US 6,543,151 B2
(45) Date of Patent: Apr. 8, 2003

(54) APPARATUS FOR DETERMINING DIAMETER OF AN OBJECT AND METHOD THEREOF

(75) Inventor: Joseph Daniel Smola, Pottstown, PA (US)

(73) Assignee: Bethlehem Steel Corporation

( * ) Notice: Subject to any disclaimer, the term of this patent is extended or adjusted under 35 U.S.C. 154(b) by 0 days.

(21) Appl. No.: 09/862,158

(22) Filed: May 21, 2001

(65) Prior Publication Data

US 2002/0178599 A1 Dec. 5, 2002

(51) Int. Cl.[7] ................................................. G01B 5/08
(52) U.S. Cl. ...................................... 33/555.1; 33/555.3
(58) Field of Search ........................... 33/555.1, 555.3, 33/679.1, 501.02, 501.03, 502, 503, 501.45, 567; 73/1.79

(56) References Cited

U.S. PATENT DOCUMENTS

| | | | |
|---|---|---|---|
| 181,809 A | | 9/1876 | Williams |
| 2,503,871 A | | 4/1950 | Hartl |
| 2,548,010 A | | 4/1951 | Frisz |
| 2,799,945 A | * | 7/1957 | Tiller ......................... 33/555.1 |
| 3,169,323 A | * | 2/1965 | Hold ........................... 33/501.6 |
| 4,141,149 A | | 2/1979 | George et al. |
| 4,389,788 A | * | 6/1983 | Balogh et al. ............. 33/555.1 |
| 4,729,174 A | * | 3/1988 | Caron et al. .................. 33/228 |
| 5,077,908 A | * | 1/1992 | Moore ........................... 33/550 |
| 5,088,207 A | | 2/1992 | Betsill et al. |
| 5,337,485 A | | 8/1994 | Chien |
| 5,404,649 A | * | 4/1995 | Hajdukiewicz et al. ....... 33/503 |
| 5,671,541 A | * | 9/1997 | Dai et al. ..................... 33/502 |
| 6,079,113 A | * | 6/2000 | Helmrichs ................... 33/542 |
| 6,381,861 B1 | * | 5/2002 | Deterling .................. 33/199 R |
| 2002/0050069 A1 | * | 5/2002 | Mellander .................... 33/551 |

* cited by examiner

Primary Examiner—Christopher W. Fulton
Assistant Examiner—Amy R. Cohen
(74) Attorney, Agent, or Firm—Harold I. Masteller, Jr.

(57) ABSTRACT

An apparatus and method for determining the diameter of a measured object including a frame having a quick disconnect fitting that demountably couples to a sensor selected from a collection of different length sensors so that the measurement range for determining diameters is increased. Each different length sensor includes a sensor probe tip that is biased in an outward direction therefrom so that when a selected sensor is coupled to the quick disconnect fitting, the probe tip contacts the measured object. The sensor includes means to generate a signal indicative of its probe tip position, and a microprocessor is programmed to receive the generated signal and provide an output display that corresponds to the diameter of the measured object.

21 Claims, 5 Drawing Sheets

APPARATUS FOR DETERMINING DIAMETER OF AN OBJECT AND METHOD THEREOF

FIELD OF THE INVENTION

This invention is directed to apparatus for measuring large diameter rolls, and in particular, it is directed to a roll diameter measuring device having an LVDT probe in combination with an internal processor programmed to provide a direct roll diameter display.

BACKGROUND OF THE INVENTION

The space between the lower and upper working rolls in a rolling mill stand define a roll gap that must be adjusted to transfer a proper rolling force from the working rolls to the incoming metal plate or strip product being manufactured. To more accurately control the thickness of the metal product, it is necessary to monitor the roll gap using any one of a variety of measuring devices known in the art. In accordance with the known state of the art, such roll gap measurement devices calculate and adjust the roll gap, and hence the rolling force, based upon the known diameters of working and backup rolls supported within the mill stand. Therefore, it follows that in order to more accurately control both the roll gap and product quality, it is necessary to be able to determine correct roll diameter to insure product quality. Accurate roll diameter measurements are necessary to set and control roll gap in both hot and cold rolling mills as well as in other industrial applications. For example, similar accuracy is required in continuous caster rolls that contain and control the path of the cast product. Similarly, it is necessary to accurately determine original and refinished roll or shaft diameter in other industrial applications including rolls in paper and plastic manufacturing processes, in large shafts used in electrical generators, and drive shafts used in marine applications. Therefore, although the present invention may be directed to metal rolling mill applications, it should be understood that the scope of the invention extends into other manufacturing processes and industries.

In a rolling mill that manufactures steel plate and sheet, large diameter rolls are used to deform, contain, and/or manipulate the product being manufactured. For example, at our rolling mill operations, a new work roll will measure between about 30–37 inches (76.20–93.98 cm) in diameter depending upon the particular mill stand. The backup rolls measure approximately 50–60 inches (127.0–152.4 cm) in diameter when they are new. Similarly, new continuous caster rolls that contain and control the liquids strand moving through the roll segments positioned below the caster mold measure somewhere between 4–12 inches (10.16–30.48 cm) in diameter. Such industrial rolls are systematically refinished throughout their service life to insure that they continue to deliver a product having good surface quality. Refinishing includes surface grinding along the roll diameter to remove any roll defects, for example pits, burrs, gouges, or wear spots that may reduce product quality, and the rolls are periodically refinished until the diameter has been reduced to a size where the roll is no longer suitable for service. Typically, roll service life ends when the roll diameter is reduced to about 90% of its original roll diameter size. For example, at our Steckel Mill, a new work roll should have a 32 inch (81.28 cm) diameter. When refinishing operations have finally reduced the roll diameter to 30 inches (76.20 cm), the roll is considered scrap and is removed from the rolling line. Therefore, in this instance, roll service life ends when the diameter is reduced to about 93.75% of the original roll diameter. Roll service life criterion will vary from mill to mill.

As clearly illustrated above, the working diameter of industrial roll and the like continually changes throughout service life. Therefore, in rolling mill applications, when operators manually adjust a roll gap, or when they calibrate a device that automatically adjusts the roll gap, it is critical for operators to have an accurate diameter reading of each roll mounted within a particular mill stand. It is also critical to the manufacturing process to have such accurate roll diameter information available from the time a new roll is installed in the mill stand and throughout its service life.

In past roll refinishing operations, both pre-grinding and post-grinding roll diameter measurements were taken with either large diameter micrometers or with Pi ($\pi$) tapes. Large diameter micrometers are heavy and awkward to use. They require considerable skill and "feel" on the part of the user in order to take accurate readings, and as a result, measurement readings are often not repeatable, particularly if the measurements are taken by different people. Such error is a constant source of concern because it may result in faulty roll gap adjustments and out-of-spec product. On the other hand, Pi tapes are also problematic because operators need to encircle the large roll circumference with the tape and read the roll diameter measurement directly from the calibrated scale that appears on the face of the tape. Again, user skill is a requirement to take accurate Pi tape measurements. Any tape sag or misalignment along the circumference of the roll will result in measurement error and inaccurate roll gap adjustments. Therefore, there is a long felt need within the art, to develop a simple large diameter measuring device that overcomes the problems and limitations set forth above.

SUMMARY OF THE INVENTION

It is therefore an object of the present invention to provide a diameter-measuring device having improved measurement repeatability.

It is a further object of the present invention to provide a measuring device that is not dependent upon user skill for accuracy.

It is another object of the present invention to provide a measuring device capable of measuring an increased diameter range as compared to measuring devices of the past.

It is a further object of the present invention to provide a measuring device having replaceable sensor probes to increase diameter measuring range.

It is an additional object of the present invention to provide a measuring device that displays direct readout corresponding to the diameter of a measured object.

It is still another object of the present invention to provide a measuring device that includes a sensor probe in combination with a microprocessor that generates an LCD display corresponding to the diameter of a measured object.

Other objects and advantages of the present invention will become apparent as a description thereof proceeds.

In satisfaction of the foregoing objects and advantages, the present invention provides a measuring apparatus having a frame adapted to receive an interchangeable sensor assemblies and a centering head adapted to engage then object being measured. The interchangeable sensor assemblies include a sensor probe that is biased in an outward direction therefrom so that its tip end contacts the measured object, and the probe includes means to generate a signal indicative of its tip end position. The frame portion of the measuring device also includes a microprocessor capable of receiving the sensor probe signals, and the microprocessor is programmed to provide an output display that corresponds to the diameter of the object.

The diameter of the object being measured is determined by storing in the microprocessor a calibrated gap distance in the based upon a first sensor probe signal indicative of probe tip position, calculating a measured gap distance based upon the stored calibrated gap distance and a second first sensor probe signal indicative of probe tip position, and determining diameter of the object based upon the calculated measured gap distance.

BRIEF DESCRIPTION OF THE DRAWINGS

The above and other objects and advantages and novel features of the present invention will become apparent from the following detailed description of the preferred embodiment of the invention illustrated in the accompanying drawings, wherein:

FIG. 1A is an alternate view of the digital display shown in FIG. 1.

DETAILED DESCRIPTION OF THE PREFERRED EMBODIMENT

Figure 1:
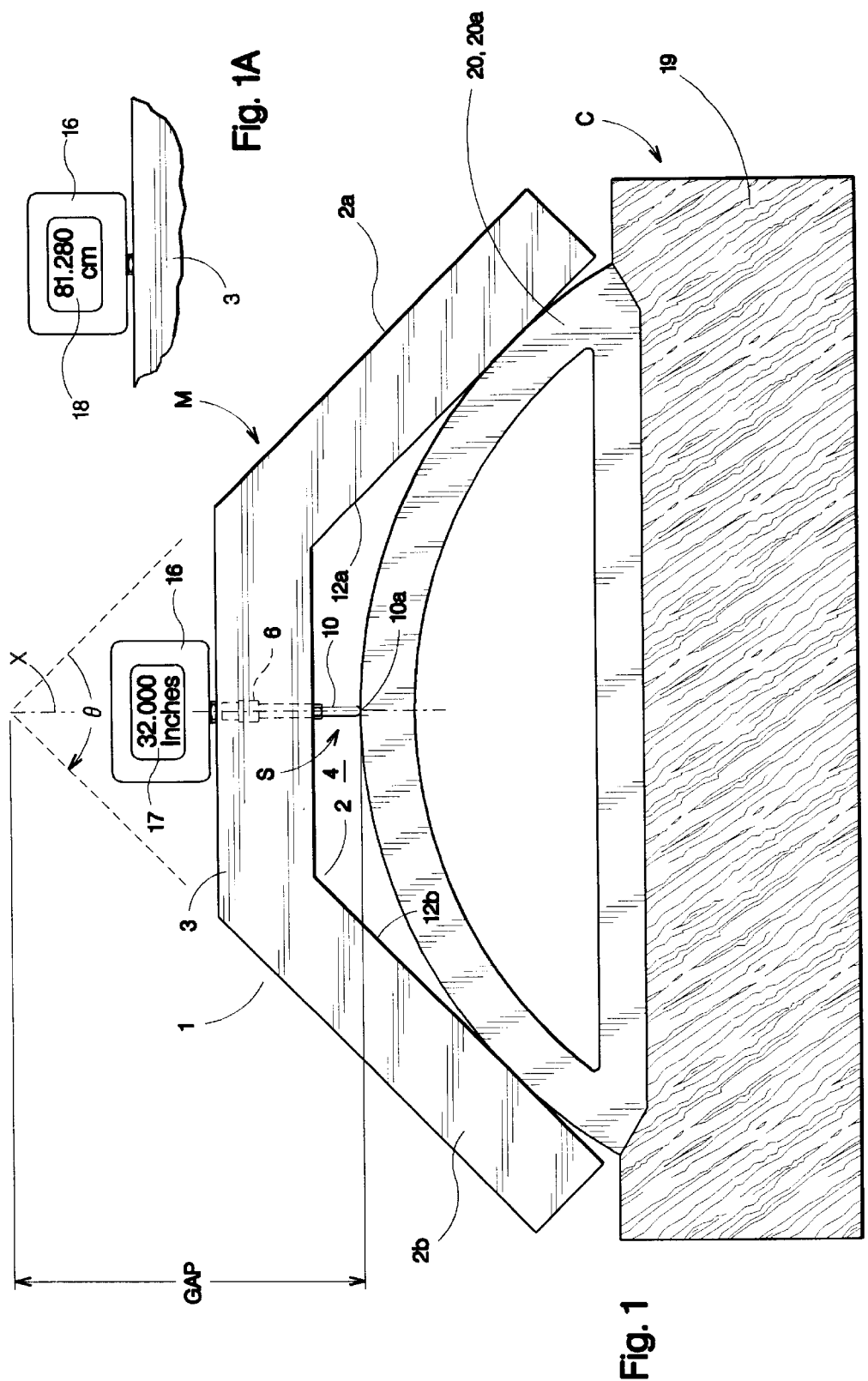
FIG. 1 is an elevation view of the preferred diameter measuring system of the present invention.
Figure 2:
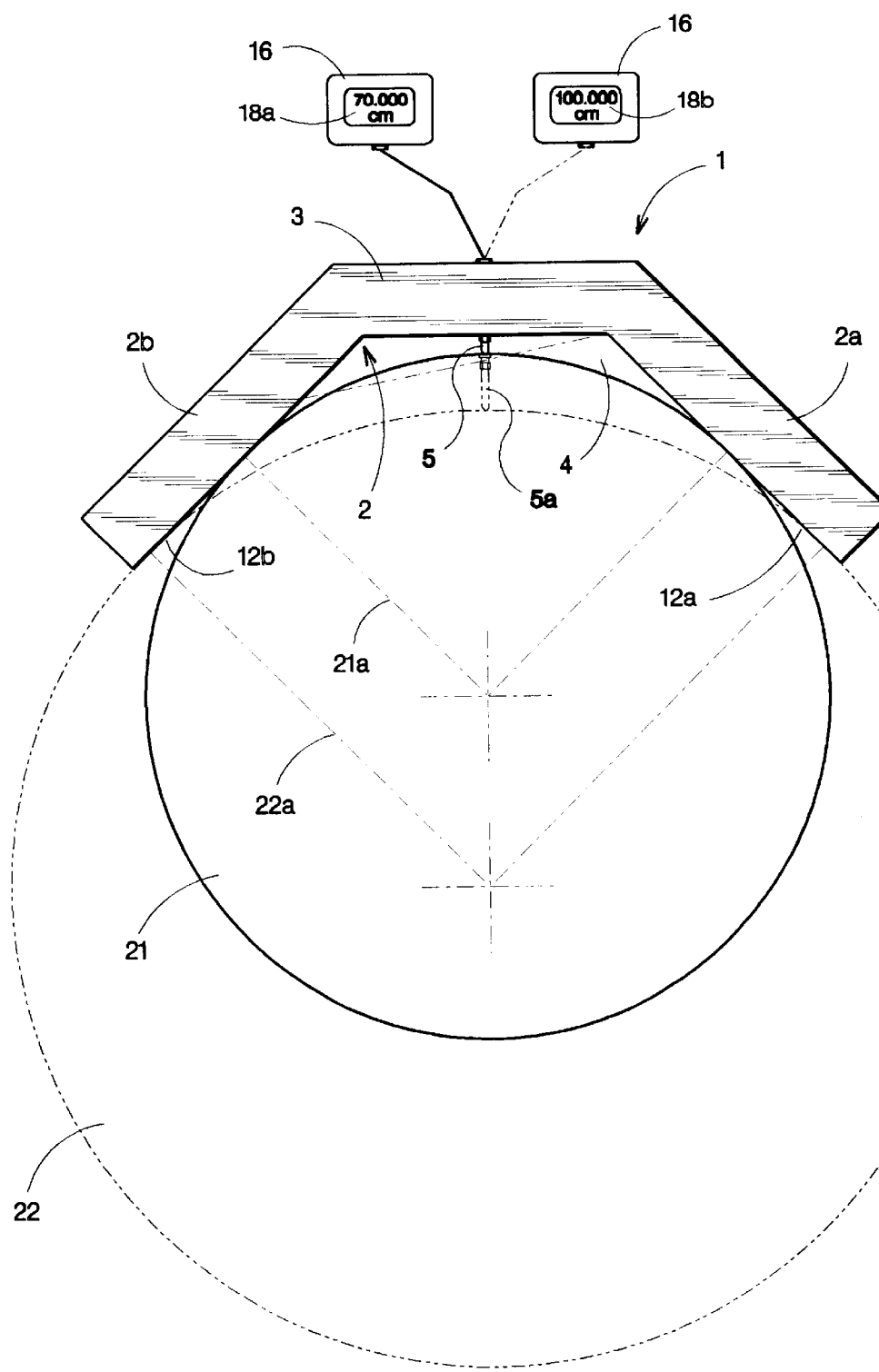
FIG. 2 is a view showing the present invention used to measure an increased range of different diameter objects.
Figure 5:
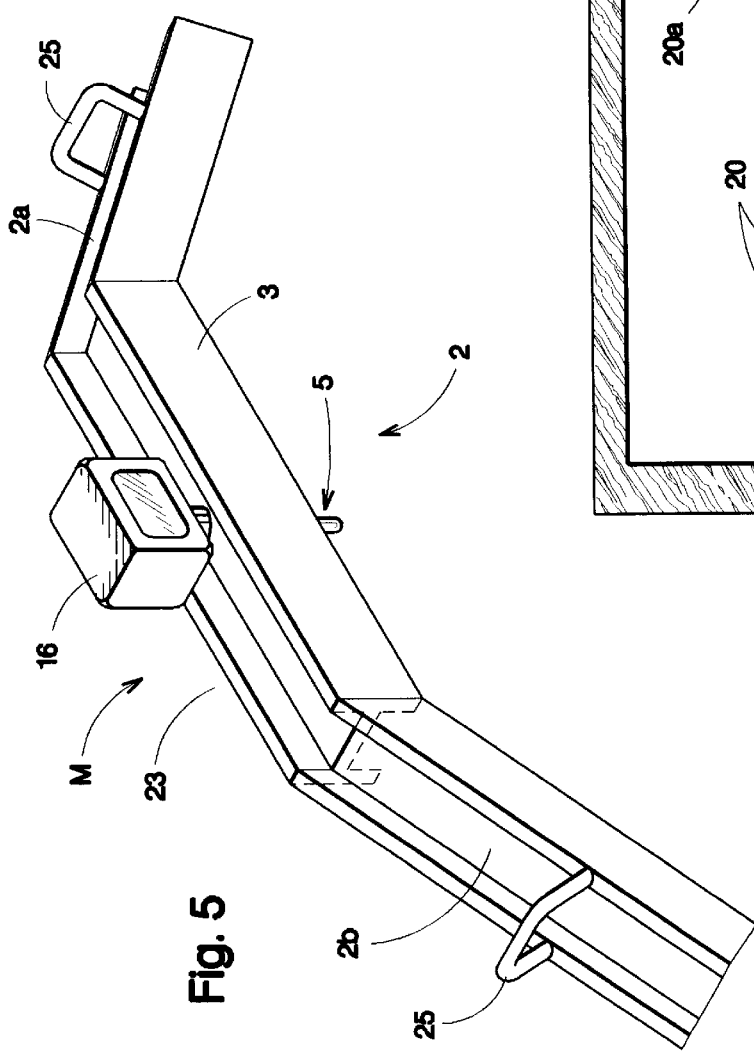
FIG. 5 is an isometric view showing an alternate frame embodiment.

Referring to FIGS. 1 and 2 of the drawings, the preferred embodiment of the present invention includes a frame 1 having a pair of converging arms or jaws 2a and 2b that extend outward from a cross member 3 to provide a centering head 2 formed by the opening 4 between jaws 2a and 2b. Preferably, frame 1 is constructed using a lightweight material having a low coefficient of expansion, and the design of the frame is such that its section modulus and torsional properties provide rigidity against bending forces. For example, as shown in FIG. 5, measuring device "M" may comprise a beam shape member 23 having sufficient depth to provide desired section properties. Suitable materials for constructing the frame include, but are not limited to, extruded aluminum or aluminum alloy materials, phenolic plastic materials, and carbon graphite materials, etc. The measuring device may include handles 25 for ease of placement along the circumference of a large diameter object, and similar to the embodiment shown in FIG. 1, includes a cross member 3, a centering head 2 formed by jaws 2a and 2b, a sensor assembly 5, a microprocessor (not shown), and a display 16.

Figure 3:
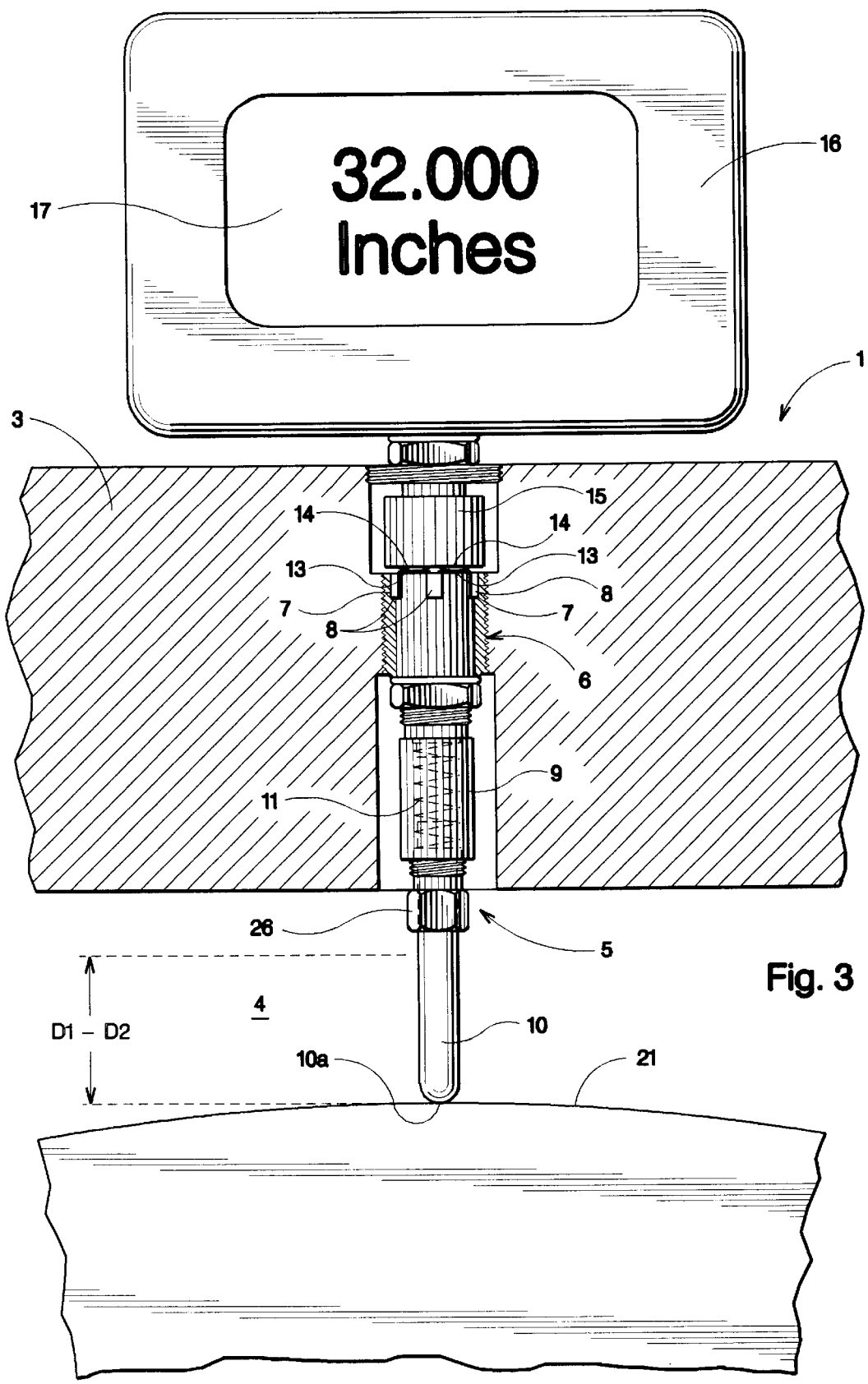
FIG. 3 is an enlarged portion of FIG. 2 showing a first sensor assembly.
Figure 4:
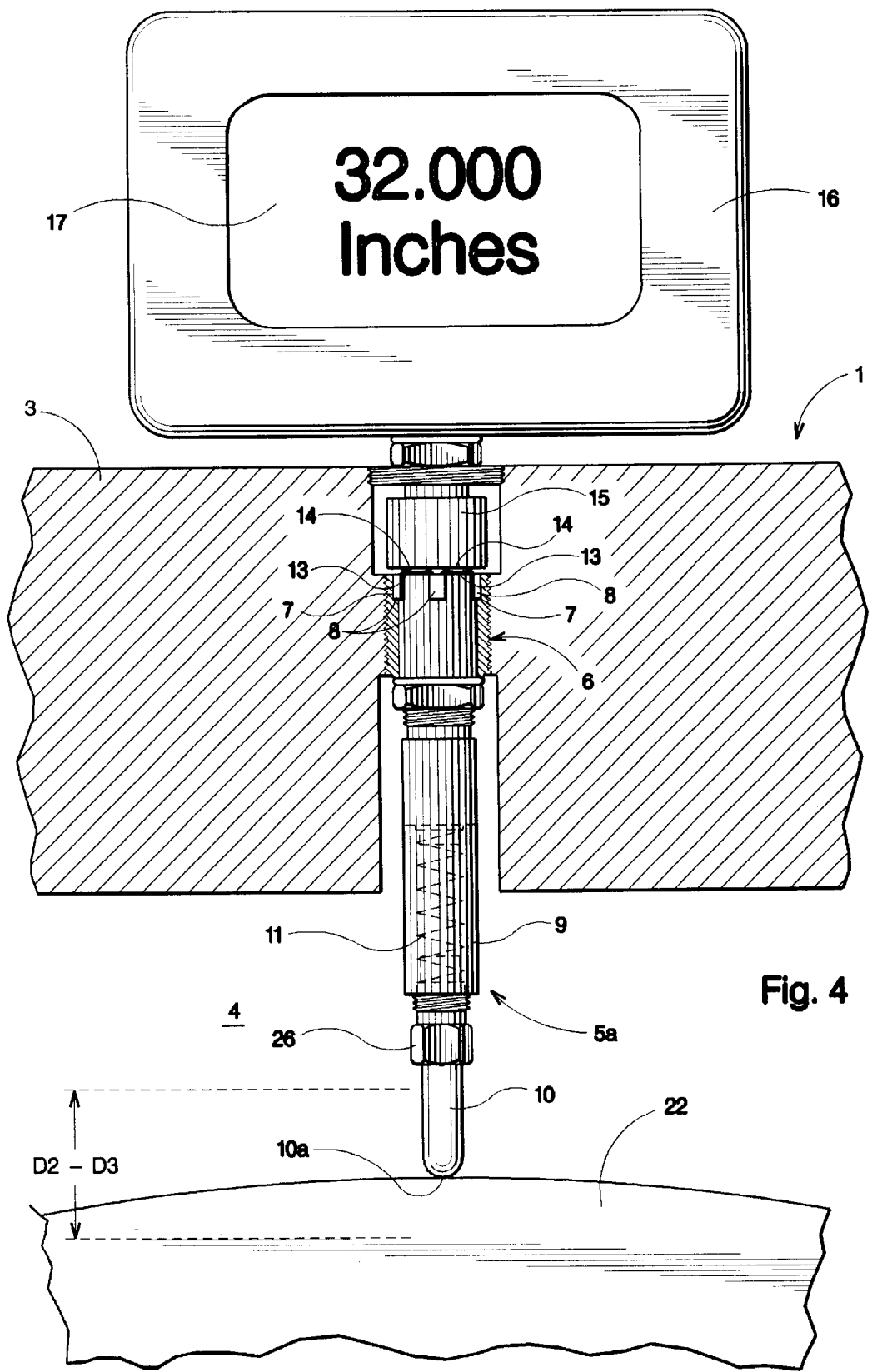
FIG. 4 is an enlarged portion of FIG. 2 showing a second sensor assembly.

Referring to the enlarged FIGS. 3 and 4, cross member 3 is adapted to receive removable sensor assemblies 5 and 5a, and the cross member includes a quick disconnect coupling 6 to facilitate attaching different removable sensor assemblies to frame 1. Any suitable locking means known in the art may be used for a quick disconnect fastener without departing from the scope of this invention. For example, a bayonet type coupling may be used to provide a quick disconnect. In the preferred embodiment shown in the drawing figures, coupling 6 includes a plurality of detents 7 shaped to receive and capture corresponding lugs 8 provided in the locking end 9 of the sensor assemblies 5 and 5a.

The sensor assemblies 5 and 5a include the above mentioned lock end 9, an extendable sensor probe 10 such as an LVDT probe or the like, and a biasing mechanism 11 positioned between the lock end 9 and probe 10. The biasing mechanism 11 continuously urges the extendable sensor probe 10 in an outward direction away from frame 1 and into opening 4 of the centering head 2. Additionally, as illustrated in FIG. 1, coupling mechanism 6 is arranged so that the sensor assembly is positioned and aligned along axis "X" that bisects an angle 9 formed by an extension of the jaws 2a and 2b. Such axial alignment insures that the extendable sensor probe 10 is radially aligned to the object being measured, for example objects 20, 21, and 22 in FIGS. 1–4, when the inside surfaces 12a and 12b of the centering head 2 tangentially engage the measured object.

Referring again to FIGS. 3 and 4, lock end 6 includes contacts 13 that communicate with corresponding contacts 14 provided in a microprocessor 15 housed within frame 1 of the measuring device portion of the diameter measuring system. The sensor probe of the sensor assembly generates an output signal indicative of the extended position of the probe tip 10a, and the microprocessor receives the sensor output signal via contacts 13 and 14.

Microprocessor 15 is programmed to process and digitize the output signal from the sensor probe and generate a digital display 16 that provides a readout, in either English units 17 or metric units 18 as illustrated in FIGS. 1 and 1A; the readout corresponding to the diameter of the object being measured.

It is well known that micrometers and the like have a limited diameter measuring range, typically one-inch diameter increments. For example, a one-inch micrometer to measure one-inch diameter and smaller round stock. A two-inch micrometer is used to measure rounds between one and two inches in diameter, and so on. Such one-inch measuring increments makes it necessary to purchase a wide range of different micrometers in order to meet various job requirements in a machine shop operation. In instances where a machine shop is manufacturing or refurbishing large diameter products, for example, working rolls and backup rolls used to manufacture metal plate and sheet products collecting a large variety of different micrometers to meet different product sizes is both inconvenient and expensive.

The present invention provides removable sensor assemblies that increase the measuring range of device "M". Referring again to FIG. 3, the extendable sensor probe 10 has a measuring range that falls between D1 and a maximum extended D2 probe position. In instances where the diameter of the object being measured falls outside the maximum D2 position, sensor assembly 5 is disconnected from coupling 6 and a different sensor assembly 5A is attached to coupling 6 as shown in FIG. 4. The different sensor assembly 5A provides an extended measuring range that falls between D2 and a maximum extended D3 probe position. Such removable sensor assemblies provide means for using a single measuring device to determine the diameter of a wide range of different diameter objects as illustrated in FIG. 2. It should be understood, however, that although the preferred embodiment shows using two sensor assemblies 5 and 5a, any number of different sensor assemblies may be coupled to frame 1 without departing from the scope of this invention. For example, referring again to FIG. 2, centering head 2 of frame 1 is shown placed on a round object 21 so that jaws 2a and 2b are tangent to the object at 21a with the probe of sensor assembly 5 extended to engage the surface of the object 21 being measured. As illustrated by the readout 18a on display 16, the round object has a 70.000 cm (27.559 inch) diameter. Similarly, when sensor assembly 5a is coupled to frame 1, jaws 2a and 2b are tangent to object 22 at 22a and the readout 18b of display 16 shows a 100.000 cm (39.370 inch) diameter for the object being measured. Therefore, using only two different sensor assemblies, the measuring device is capable of measuring a range of diameters that would have required using 11–12 different micrometers and anvil combinations as taught in the past.

Figure 6:
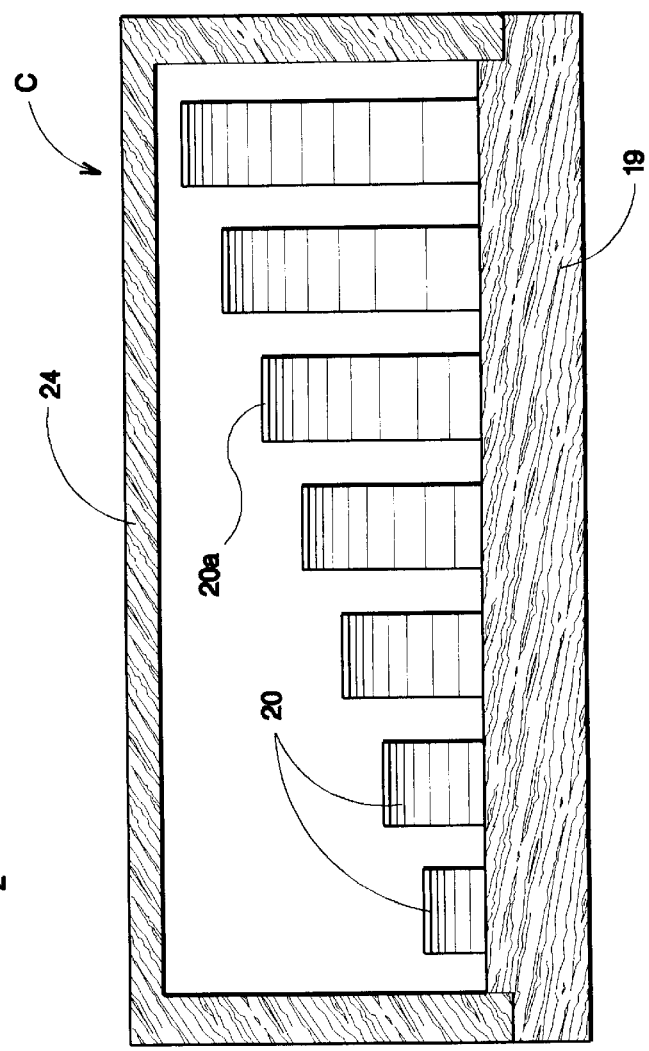
FIG. 6 is a cross-section view taken through a set of calibration rings included in the diameter measuring system.

Referring now to FIGS. 1 and 6, a diameter measuring kit or set includes a measuring device "M", at least one replaceable sensor assembly "S", and a collection of calibration rings "CC". Preferably, collection "C" comprises a plurality of ring segments 20, each ring segment providing a different measurement standard for calibrating the sensor probe 10. The number of ring segments will correspond to the diameter measuring range of a particular kit or system, and the measuring range is determined by the number of interchangeable or replaceable sensor assemblies "S" in a particular kit. In the preferred embodiment, collection "C" comprises a calibration box having a base 19 adapted to hold the ring segments 20 and a lid or cover 24 to protect the ring segments 20 from damage when they are not being used.

In a machining operation for refurbishing mill rolls, an operator will first calibrate the measuring device "M" using an appropriate ring segment 20a that is slightly larger in diameter than the work piece. To illustrate, lets assume that a 32 inch (81.280 cm) diameter mill roll has been removed from a mill stand for roll surface refinishing. The 32 inch measurement is representative of the "new roll" diameter when the roll was first placed into service. A machinist will first select an appropriate ring segment to calibrate the measuring device, for example 32 inch (81.280 cm) diameter ring segment 20a provided in collection "C". Referring for a moment to either FIG. 3 or 4, a lock ring 26 is loosened to adjust the sensor probe 10 until the digital display 16 reads either 32.000 inches or 81.280 cm depending on the units selected. When the sensor probe is calibrated to the proper diameter measurement for the selected calibration ring segment 20a, lock ring 26 is tightened and the measuring device "M" is ready for use. Referring to FIG. 1, the readout on the digital display is responsive to a calibrated "GAP" distance measured from the vertex of angle to the tip 10a of the sensor probe, and the calibrated "GAP" distance is stored in microprocessor 15 (FIG. 3) for later use in determining roll diameter during the machining operation.

As the work piece is machined, its diameter may be periodically measured, and its changing machined size affects its position within the centering head 2. For example, the exemplary different work pieces 21 and 22 (FIG. 2) show that the diameter size determines the position of a work piece within the centering head 2. During machining, the decreasing diameter of the work piece results in a measured "GAP" distance that is less than the calibrated "GAP" distance. Microprocessor 15 is programmed to calculate the measured "GAP" by comparing the difference between the calibrated "GAP" and different position of the probe tip 10a, and the calculated "GAP" is multiplied by a constant to determine the diameter of the measured object as shown at the different Roll Measurements 1–4 in the following Table A.

TABLE A

Machining Operation - 32 Inch Roll

| Measured Object | $\sqrt{2r^2-r}$ GAP | OD/GAP Constant | Roll OD Display (inches) |
| --- | --- | --- | --- |
| Calibration GAP | 6.6274 | 4.8284 | 32.0000 |
| Roll Measurement No. 1 | 6.5239 | 4.8284 | 31.5000 |
| Roll Measurement No. 2 | 6.4203 | 4.8284 | 31.0000 |
| Roll Measurement No. 3 | 6.3168 | 4.8284 | 30.5000 |
| Roll Measurement No. 4 | 6.2132 | 4.8284 | 30.0000 |

Table A shows an exemplary series of roll measurements that may be taken throughout the service life of 32 inch roll. To illustrate, when the example roll is brought into service, mill operators calibrate measuring device "M" using the 32 inch ring segment 20a (FIGS. 1 and 6). Device "M" is then positioned along the circumference of roll 21 (FIG. 2), and a diameter reading is taken to verify roll size. The resulting digitized output on display 16 (FIG. 3) is recorded for future use and for setting roll gap in the manufacturing operation. Throughout its service life, the roll is periodically removed from the mill stand for reconditioning worn or damaged roll surface areas. Each time the exemplary roll 21 is removed from the mill stand for refurbishing, the measuring device "M" is calibrated using the 32 inch calibration ring segment 20a before new diameter measurements are taken during the machining operation. As heretofore mentioned above, the change in the "GAP", herein defined as a distance from the vertex of angle to the sensor probe tip 10a. In instances where the roll 21 is in use at our operation, when the digitized output on display 16 reads 30 inches or less (81.280 cm), the roll is considered scrap and is removed from service.

While this invention has been described as having a preferred design, it is understood that the invention is not limited to the illustrated and described features. To the contrary, the invention is capable of further modifications, uses, and/or adaptations following the general principles of the invention and therefore includes such departures from the present disclosure as come within known or customary practice in the art to which the invention pertains, and as may be applied to the central features set forth above, and which fall within the scope of the appended claims.

I claim:

1. A measuring apparatus having an increased measurement range for determining a diameter of a measured object, comprising:
   a) a frame including a centering head adapted to engage the measured object;
   b) a combination quick disconnect fitting and collection of different length sensors, said quick disconnect fitting fixed to said frame and adapted to demountably couple to a sensor selected from said collection of different length sensors, said combination quick disconnect fitting and collection of different length sensors providing said increased measurement range; and
   c) a microprocessor to receive signals generated by said selected sensor coupled to said quick disconnect fitting, said generated signals received from said selected and demountably coupled sensor being indicative of the diameter of the measured object, said microprocessor programmed to process said generated signals and provide an output display that corresponds to said diameter.

2. The measuring apparatus recited in claim 1 wherein the centering head is adapted to radially align said selected and demountably coupled sensor to the measured object engaged by said centering head.

3. The measuring apparatus recited in claim 1 wherein said selected and demountably coupled sensor is an LVDT probe.

4. The measuring apparatus recited in claim 1 wherein a probe tip biased in an outward direction from said selected and demountably coupled sensor contacts the measured object and said microprocessor is programmed to calculate a measured gap distance based upon generated sensor signals indicative of said probe tip position.

5. The measuring apparatus recited in claim 4 including a mechanism to calibrate the selected and demountably coupled sensor to a measurement standard so that said calibrated sensor generates signals indicative of a calibrated gap distance to said probe tip position.

6. The measuring apparatus recited in claim 5 wherein said microprocessor is programmed to compare said measured gap distance to said calibrated gap distance and generate signals that provide a display corresponding to the diameter of the measured object.

7. A kit to provide an increased measurement range in a device that measures a diameter of an object, said kit comprising:
   a) at least one measuring device having a frame to engage a measured object, said frame including;
      i) a quick disconnect fitting adapted to demountably couple to a sensor so that any sensor selected from a collection of different length sensors may be demountably coupled to said quick disconnect fitting and thereby provide said increased measurement range; and
      ii) a microprocessor to receive, process, and display an output in response to signals generated by a selected sensor demountably coupled to said quick disconnect fitting;
   b) at least one sensor adapted to demountably couple to said quick disconnect fitting; and
   c) at least one calibration standard.

8. The kit of claim 7 comprising:
   a) a collection of different length sensors; and
   b) a plurality of calibration standards that correspond with said collection of different length sensors.

9. The kit of claim 7 wherein said at least one measuring device includes a centering head portion adapted to radially align said measuring device to an object being measured.

10. A method for increasing a measurement range in a measuring device used to determine a diameter of a measured object, the steps of the method comprising:
    a) selecting a sensor form a collection of different length sensors
    b) demountably coupling said selected sensor to a quick disconnect fitting provided in said measuring device;
    c) placing said measuring device on a calibration standard surface corresponding to said selected sensor so that a probe tip extending outward from said selected sensor engages the calibration standard surface;
    d) determining a calibrated gap distance based upon a position of said probe tip engaged against said calibration standard surface;
    e) placing said measuring device on a surface of the measured object so that said probe tip extending outward from said selected sensor engages the surface of the measured object;
    f) calculating a measured gap distance by comparing said calibrated gap distance to a position of said probe tip engaged against the surface of the measured object;
    g) determining the diameter of the measured object based upon the measured gap distance; and
    h) increasing the measurement range of said measurement device by repeating steps a–d) when said probe tip of step e) fails engage the surface of the measured object.

11. The method according to claim 10 including a further step of generating sensor signals indicative of said probe tip position.

12. The method according to claim 11 including a further step of programming a microprocessor to receive said generated sensor signals, said programmed microprocessor;
    a) determining and storing said calibrated gap distance in response to said sensor signals;
    b) calculating said measured gap distance in response to said sensor signals; and
    c) determining the diameter of the measured object based upon said calculated measured gap distance.

13. The method according to claim 11 wherein said signals indicative of said calibrated gap distance are received by said quick disconnect fitting and relayed to said microprocessor.

14. The method according to claim 11 wherein said generated signals are indicative of the diameter of the measured object.

15. The method according to claim 11 including a further step of multiplying said measured gap distance by a constant to determine the diameter of the measured object.

16. The method according to claim 10 wherein when said probe tip of step d) fails to engage the surface of the measured object, said measuring range is increased by providing the further steps, comprising:
    a) removing said selected sensor demountably coupled to said quick disconnect fitting;
    b) selecting another sensor from said collection of different length sensors;
    c) demountably coupling said other sensor to said quick disconnect fitting;
    d) selecting another calibration standard corresponding to said other demountably coupled sensor;
    e) determining a new calibrated gap distance based upon said other calibration standard corresponding said selected other sensor; and
    f) determining the diameter of the measured object.

17. The method according to claim 16 wherein said other sensor of step b) is a longer length sensor and said measured object has a larger diameter.

18. The method according to claim 16 wherein said other sensor of step b) is a shorter length sensor and said measured object has a smaller diameter.

19. The method according to claim 10 wherein said quick disconnect fitting includes at least one electrical contact to receive and relay to said microprocessor said signals generated by said selected and demountably coupled sensor.

20. The method according to claim 19 wherein said generated signals are indicative of the diameter of the measured object.

21. The method according to claim 10 wherein said quick disconnect fitting includes at least one electrical contact capable of receiving and relaying to said microprocessor said signals generated by a sensor demountably coupled to said quick disconnect fitting.

* * * * *